(12) United States Patent  
Kelley

(10) Patent No.: US 9,079,336 B2  
(45) Date of Patent: Jul. 14, 2015

(54) DURABLE PLASTIC FENCING

(76) Inventor: Patrick W. Kelley, Saylorsburg, PA (US)

( * ) Notice: Subject to any disclaimer, the term of this patent is extended or adjusted under 35 U.S.C. 154(b) by 1423 days.

(21) Appl. No.: 12/386,897

(22) Filed: Apr. 24, 2009

(65) Prior Publication Data

US 2009/0206313 A1 Aug. 20, 2009

Related U.S. Application Data

(63) Continuation-in-part of application No. 10/691,416, filed on Oct. 22, 2003, now abandoned, and a continuation-in-part of application No. 10/082,604, filed on Feb. 25, 2002, now abandoned.

(60) Provisional application No. 60/272,743, filed on Mar. 2, 2001.

(51) Int. Cl.
| | |
|---|---|
| *E04H 17/14* | (2006.01) |
| *B29B 17/00* | (2006.01) |
| *B29C 47/88* | (2006.01) |
| *B29C 47/00* | (2006.01) |
| *B29C 47/04* | (2006.01) |
| *B29K 23/00* | (2006.01) |
| *B29K 67/00* | (2006.01) |
| *B29K 105/26* | (2006.01) |
| *B29L 31/06* | (2006.01) |
| *B29L 31/00* | (2006.01) |

(52) U.S. Cl.
CPC ......... *B29B 17/0042* (2013.01); *B29C 47/0023* (2013.01); *B29C 47/8815* (2013.01); *B29C 47/003* (2013.01); *B29C 47/0016* (2013.01); *B29C 47/0026* (2013.01); *B29C 47/0033* (2013.01); *B29C 47/0057* (2013.01); *B29C 47/0059* (2013.01); *B29C 47/0066* (2013.01); *B29C 47/046* (2013.01); *B29K 2023/06* (2013.01); *B29K 2023/065* (2013.01); *B29K 2023/12* (2013.01); *B29K 2067/00* (2013.01); *B29K 2105/26* (2013.01); *B29L 2031/06* (2013.01); *B29L 2031/73* (2013.01)

(58) Field of Classification Search
USPC ............................. 256/19; 428/15, 17, 18, 20
See application file for complete search history.

(56) References Cited

U.S. PATENT DOCUMENTS

| | | | | |
|---|---|---|---|---|
| 2,628,823 | A * | 2/1953 | Rhome et al. | 256/19 |
| 4,324,388 | A * | 4/1982 | Klaser | 256/19 |
| 4,357,000 | A * | 11/1982 | Tisbo et al. | 256/19 |
| 4,540,160 | A * | 9/1985 | Zanavich et al. | 256/19 |
| 4,602,765 | A * | 7/1986 | Loper et al. | 256/19 |
| 5,601,279 | A * | 2/1997 | Schwartz et al. | 256/19 |
| 5,927,694 | A * | 7/1999 | Montepiano | 256/19 |

\* cited by examiner

*Primary Examiner* — Michael P Ferguson  
(74) *Attorney, Agent, or Firm* — Thomas E Kelley

(57) ABSTRACT

Durable post and rail fencing comprises polyolefin posts and rails having a nominal diameter greater than 2.5 inches and a flexural modulus at 40° F. of at least 110,000 psi. Such rails and posts produced by extrusion through a circular die to a heat transfer medium to provide a log-like shape.

6 Claims, 2 Drawing Sheets

DURABLE PLASTIC FENCING

CROSS REFERENCE TO RELATED APPLICATIONS

This application is a continuation in part of and claims benefit under 35 U.S.C. 120 of prior application Ser. No. 10/691,416, filed Oct. 22, 2003 now abandoned and Ser. No. 10/082,604, filed Feb. 25, 2002 and under 35 USC §119(e) of U.S. provisional application Ser. No. 60/272,743, filed Mar. 2, 2001, all of which are incorporated herein by reference.

FIELD OF THE INVENTION

Disclosed herein are plastic fencing comprising plastic logs which are useful for post and rails and methods of making such logs, e.g. from recycled plastic materials.

SUMMARY OF THIS INVENTION

This invention provides plastic logs in sizes useful for fence applications, e.g. having an average diameter greater than 2 inches, e.g. at least 2.5 inches, in certain aspects at least about 3 inches. Such logs are characterized by a flexural modulus at 40° F. of at least 110,000 psi. Such logs are further characterized by a diameter deviation which provides a natural log-like appearance.

Logs of this invention preferably comprise a substantial amount of recycled thermoplastic material, e.g. at least about 80% thermoplastic material. Preferred aspects of this invention provide plastic logs substantially comprising polyolefin selected from the group consisting of polyethylene (e.g. HDPE) and polypropylene (PP). The composition of such polyolefin logs can further comprise at least one other polymeric material having a melt temperature higher than the polyolefin material, e.g. at least about 20° C. higher than the melt temperature of the polyolefin.

This invention also provides methods of producing a plastic, cylindrical log by extruding a molten mass of plastic material through a circular die to form a cylindrical mass with a molten surface and cooling the molten surface with an air stream. The air stream preferably flows from an annular nozzle proximate to said die.

DETAILED DESCRIPTION OF THE PREFERRED EMBODIMENTS

Logs formed from a molten mass extruded through a circular die as shown herein can be cut into useful lengths of posts and rails.

As used herein the term "average diameter" is determined from the average of four measurements of log diameter at 45° increments at a cross sectioned cut of a log.

The logs of this invention preferably have a deviation in diameter to simulate deviations in a natural wood log. Such diameter deviation is be expressed as the percent difference between the minimum diameter (d) and the maximum diameter (D) by the following formula:

Diameter deviation=$((D-d)/D) \times 100$

Such diameter deviation is at least 2% and less than 60%, more preferably at least 4% and less than 40%, even more preferably in the range of 5 to 25%.

As used herein the term "flexural modulus" means a measure of resistance to bending and is determined by measuring the deflection (D) resulting from a load (W) on the center span of a length (L) of log of average radius (r). Flexural modulus, E, is determined from the formula $$E=(W/D)(L^3/12\pi r^4)$$

The logs of this invention preferably have a flexural modulus of at least 110,000 pounds per square inch (psi) at 40° F.

The logs of this invention are fabricated from polyolefin, e.g. preferably at least 80% polyolefin, more preferably at least 90% polyolefin, selected from the group consisting of polypropylene and polyethylene and mixtures thereof. Useful polyethylene includes high density polyethylene (HDPE), low density polyethylene (LDPE) and linear low density polyethylene (LLDPE). HDPE from recycled scrap plastic is preferably shredded and dried to remove moisture which can vaporize in extruders causing cavitation. Useful drying methods include passing the plastic through a fluidizing bed of low relative humidity air to extract typically surface moisture from the scrap plastic. In general it is not necessary to remove dried "soil", e.g. residual contents such as food, beverages or cleaners from the plastic. Even with drying some moisture is likely to enter the extruder. Venting practices well known in the extruder art can be employed to remove vaporized moisture from the extruder.

Mixed scrap plastics are preferably blended to provide a composition range requiring minimal adjustments, e.g. in extruder operating temperatures. In preferred embodiments useful compositions include at least 80% polyolefin and the extruder conditions are adjusted for processing a substantially polyolefin composition. It is also preferred to provide a color concentrate to provide natural wood colors to the extruded shape. Desirable colors include shades of browns, yellows and grays to simulate aged wood.

Figure 1:
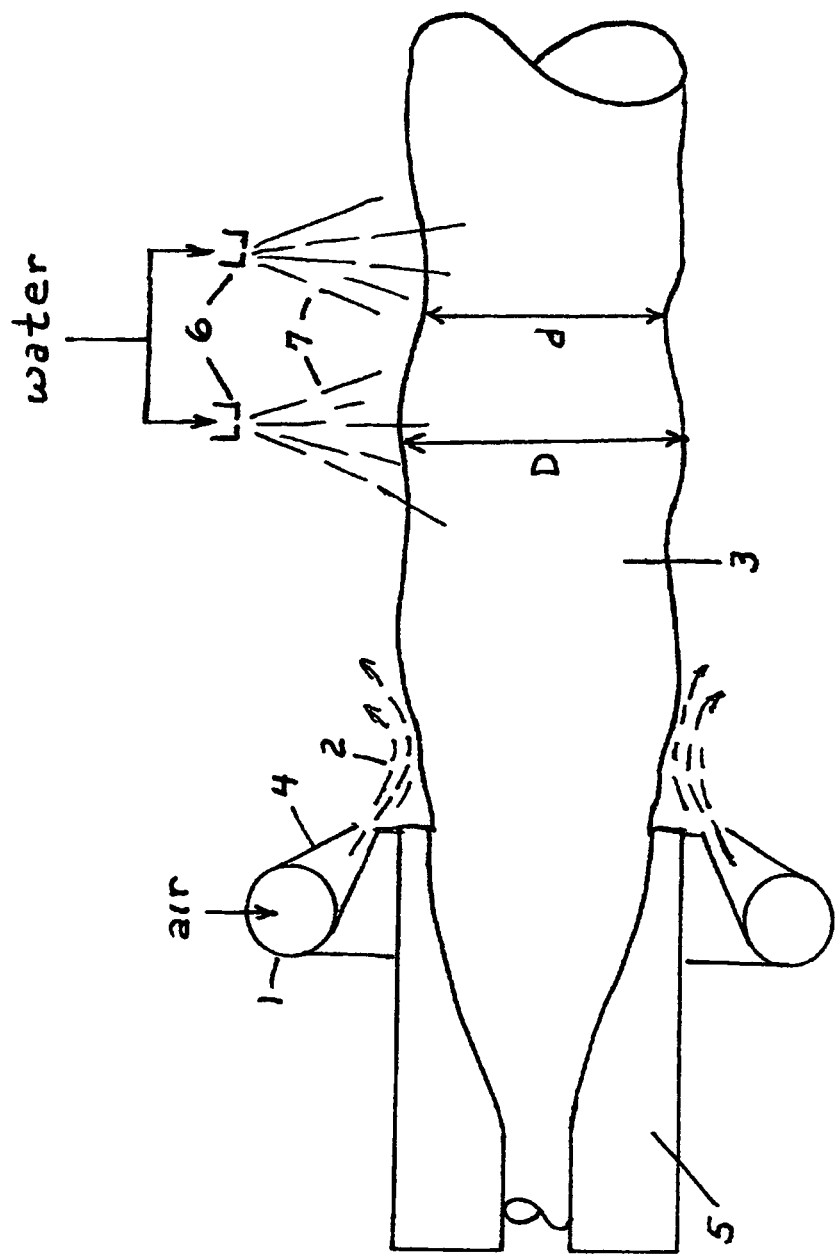
FIG. 1 serves to illustrate an embodiment of heat transfer of an extruded log shape and FIG. 2 illustrates a fencing system comprising posts 20 and rails 21.
Figure 2:
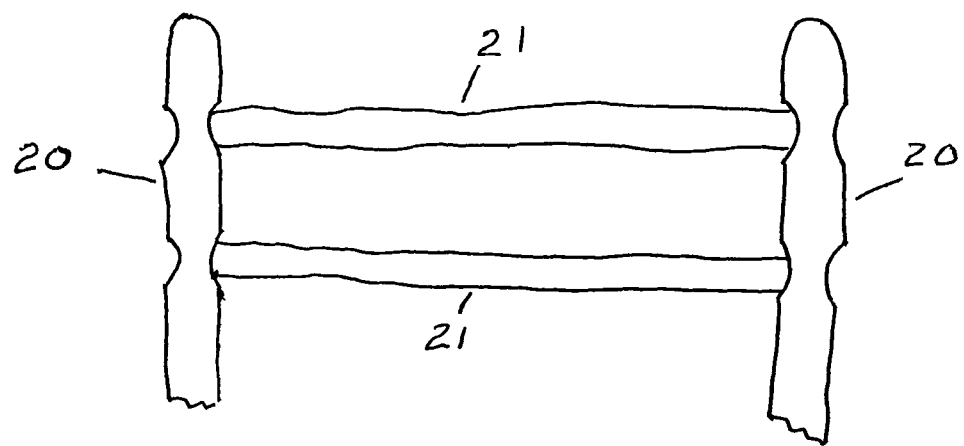

Shredded plastic scrap and color concentrate are fed to an extruder to provide a molten mass at about the melt temperature of the polyolefin component. The molten extrudate is forced through a circular die to form the log shape. Due to the phenomena of die swell it is useful to employ an extended die with a progressively increasing diameter to minimize swell after the molten mass has left the confinement of the die. It is generally preferred to cool the surface of the extruded shape as uniformly and rapidly as possible using a heat transfer fluid directed from an annular source place close to the die. Useful heat transfer fluids include air and water. Air, e.g. cooled air, is a preferred heat transfer fluid which can put a smooth, glossy skin on a log without unduly or inadvertently chilling the die. With reference to FIG. 1 there is shown an embodiment of a heat transfer fluid nozzle 1 for directing a cooling fluid 2, e.g. gas or liquid, to the surface of an extruded shape 3 of molten polyolefin. A nozzle lip 4 directs the fluid away from the face of an expanding circular die 5. After initial heat transfer for forming a skin, supplemental heat transfer can be effected by spray nozzles 6 directing a cooling liquid 7 to the solid log. Surface deformation at the die to provide a log-like texture on the surface is believed to result from a combination of irregular shrinkage and mass migration in the short zone from the edge of the die until a rigid skin is formed by heat transfer.

Because long lengths of extruded log are preferred and because of slow heat transfer into the bulk of the extruded shape it is useful to extruded in a horizontal direction supporting the shape on rollers or other conveyer system as close to the die as possible to minimize distortion from gravity induced sag. Because of the bulk of the log and slow heat transfer it is useful to effect heat transfer by immersion in a heat transfer liquid such as water as the shape is being carried from the die. Immersion can be effected by shower or bath. Moreover, because there is little compressive strength in the molten mass exiting the die, it is useful to carry the shape from the die at a constant speed, e.g. at about the speed of extrusion, to minimize cross sectional distortion. In one preferred embodiment the extruded shape is pulled at faster than the linear speed of extrusion to provide an extruded shape with reduced cross section as compared to the die; such reduced cross-sectioned extruded shapes, e.g. not more than 3.5 inches in average diameter, are especially useful for fence rails. In another preferred embodiment the extruded shape is pulled at slower than the linear speed of extrusion to provide an extruded shape with enlarged cross section as compared to the die; such enlarged cross-sectioned extruded shapes, e.g. not less than 3.5 inches in average diameter, are especially useful for fence posts. Pulling of the extruded shape can be effected by friction contact with a moving surface.

Cooling is desirable to stabilize the extruded shape. The extruded shape is preferably conveyed in a heat transfer fluid until the outer portion of the mass is sufficiently cool to maintain a desired log shaped surface. Logs can be cut from a moving, cooling shape into desired lengths, e.g. 8 to 10 feet is a useful length for fence rails and 5 to 7 feet is a useful length for fence posts. Rail slots in posts can be cut by power saws or mortising drills. Tapered rail ends can be cut by power saw.

The following examples illustrate one embodiment of the invention.

EXAMPLE 1

Plastic scrap consisting essentially of HDPE and PET is shredded, dried and fed to an extruder feed hopper with a brown color concentrate. The extruder heaters are set to bring the plastic mass to a temperature of 200° C. as it is fed through an expanding circular die having an exit diameter of 3.5 inches. An annular air nozzle is set adjacent to the die face to blow cold air along the surface of the extruded shape in the direction of extrudate motion. The extruded shape is supported by a roller conveyor from a distance of about 2 inches from the annular air nozzle through 5 feet of a water shower. Logs with an average diameter of 2.5 to 3 inches were cut in 9 foot lengths and stored on racks to permit air convection cooling of residual heat. A log produced in this example was supported at an 8 foot span and loaded by an 85 pound weight at mid span. The log deflection was 1.625 inches. Flexural modulus was determined to be about 132,000 psi.

EXAMPLE 2

Plastic scrap consisting essentially of HDPE (flexural modulus of 125,000 to 225,000 psi) is shredded, washed and dried and fed to an extruder feed hopper with a brown color concentrate. The extruder heaters are set to bring the plastic mass to a temperature of 175° C. as it is fed through an expanding circular die having an exit diameter of 3.5 inches. An annular air nozzle is set adjacent to the die face to blow cold air along the surface of the extruded shape in the direction of extrudate motion. The extruded shape is supported by a roller conveyor from a distance of about 2 inches from the annular air nozzle through a water shower.

EXAMPLE 3

Plastic scrap consisting essentially of polypropylene (flexural modulus of 170,000 to 250,000 psi) is shredded, washed and dried and fed to an extruder feed hopper with a brown color concentrate. The extruder heaters are set to bring the plastic mass to a temperature of 220° C. as it is fed through an expanding circular die having an exit diameter of 3.5 inches. An annular air nozzle is set adjacent to the die face to blow cold air along the surface of the extruded shape in the direction of extrudate motion. The extruded shape is supported by a roller conveyor from a distance of about 2 inches from the annular air nozzle through a water shower.

EXAMPLE 4

Post and rail fencing is constructed using posts and rails produced in the above examples where posts are in the range of 5 to 7 feet long with one to three holes for receiving rails which are in the range of 8 to 10 feet long and have tapered ends. The fence is durable against impact with a sledge hammer.

What is claimed is:

1. A post and rail fence wherein posts and rails are logs having an average diameter greater than 2.5 inches, wherein said logs are polyolefin with a rigid skin having surface deformation in said skin in a diameter deviation in the range of 2 to 60% providing a natural log-textured appearance in said skin, and wherein said logs have a flexural modulus at 40° F. of at least 110,000 psi whereby said logs resist sagging.

2. The post and rail fence of claim 1 wherein said logs are polypropylene, polyethylene or a mixture thereof.

3. The post and rail fence of claim 1 wherein said logs are formed by extruding polyolefin through a circular die.

4. The post and rail fence of claim 3 wherein said logs are polypropylene, polyethylene or a mixture thereof.

5. The post and rail fence of claim 3 wherein the surface of the extruded log is cooled uniformly and rapidly using a heat transfer fluid directed from an annular source placed close to the die.

6. The post and rail fence of claim 5 wherein said logs are polypropylene, polyethylene or a mixture thereof.

* * * * *